United States Patent

Stiltner et al.

[11] Patent Number: 6,030,019
[45] Date of Patent: Feb. 29, 2000

[54] TRUCK TAILGATE WITH KEY ACTUATED LOCK

[76] Inventors: Bernard Stiltner; Kristiana K. Stiltner, both of 17986 Reed St., Melvindale, Mich. 48122

[21] Appl. No.: 09/146,111

[22] Filed: Sep. 3, 1998

[51] Int. Cl.⁷ .................................................. B62D 25/00
[52] U.S. Cl. ........................... 296/57.1; 296/106; 292/39; 292/DIG. 29; 70/120
[58] Field of Search ........................... 296/50, 57.1, 106; 292/35, 39, 41, DIG. 29, DIG. 43, 144; 70/280, 118, 120

[56] References Cited

U.S. PATENT DOCUMENTS

| | | | |
|---|---|---|---|
| 463,297 | 11/1891 | Starrett | 70/280 |
| 1,633,173 | 6/1927 | Freedman et al. | 70/120 |
| 2,219,132 | 10/1940 | Hohmann | 70/280 |
| 3,146,021 | 8/1964 | Ericson | 296/57.1 |
| 3,180,673 | 4/1965 | Wanlass | 296/106 |
| 3,270,151 | 8/1966 | Godette | 70/280 |
| 4,358,150 | 11/1982 | Nash | 296/57.1 |
| 4,805,427 | 2/1989 | Bates et al. | 70/264 |
| 5,040,390 | 8/1991 | Mistry et al. | 292/DIG. 43 |
| 5,386,713 | 2/1995 | Wilson | 70/280 |

*Primary Examiner*—Dennis H. Pedder

[57] ABSTRACT

A truck tailgate key-actuated locking mechanism is provided including a truck with a truck bed and a tailgate. At least one locking arm is pivotally mounted on the tailgate with a first orientation for allowing the opening of the tailgate and a second orientation for precluding the opening of the tailgate. A key assembly is adapted to receive a key. Such key assembly remains in communication with the locking arm for positioning the same in the first orientation upon the rotation of the key in a first direction and further for positioning the same in the second orientation upon the rotation of the key in a second direction.

6 Claims, 2 Drawing Sheets

TRUCK TAILGATE WITH KEY ACTUATED LOCK

BACKGROUND OF THE INVENTION

1. Field of the Invention

The present invention relates to tailgate locking assemblies and more particularly pertains to a new truck tailgate with key actuated lock for preventing the unauthorized opening or theft of a tailgate.

2. Description of the Prior Art

The use of tailgate locking assemblies is known in the prior art. More specifically, tailgate locking assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art tailgate locking assemblies and the like include U.S. Pat. Nos. 5,004,287; 4,358,150; 3,022,108; 4,021,065; 3,146,021; and 2,911,247.

In these respects, the truck tailgate with key actuated lock according to the present invention substantially departs from the conventional concepts and designs of the prior art, and in so doing provides an apparatus primarily developed for the purpose of preventing the unauthorized opening or theft of a tailgate.

SUMMARY OF THE INVENTION

In view of the foregoing disadvantages inherent in the known types of tailgate locking assemblies now present in the prior art, the present invention provides a new truck tailgate with key actuated lock construction wherein the same can be utilized for preventing the unauthorized opening or theft of a tailgate.

The general purpose of the present invention, which will be described subsequently in greater detail, is to provide a new truck tailgate with key actuated lock apparatus and method which has many of the advantages of the tailgate locking assemblies mentioned heretofore and many novel features that result in a new truck tailgate with key actuated lock which is not anticipated, rendered obvious, suggested, or even implied by any of the prior art tailgate locking assemblies, either alone or in any combination thereof.

To attain this, the present invention is adapted for use with a truck having a truck bed defined by a rectangular bottom face and a pair of rectangular side walls. Such side walls are coupled to elongated side edges of the bottom face and extend upwardly therefrom to define a rectangular rear opening. As shown in FIGS. 1 & 2, the rear opening of the truck bed is encompassed by an elongated lower edge and a pair of short side edges. The truck further includes a tailgate with a planar rectangular configuration. The tailgate is defined by a planar rectangular outboard face, a planar rectangular inboard face and a thin periphery. This periphery is in turn defined by a top edge, a bottom edge and a pair of intermediate edges coupled to define an interior space. The bottom edge of the tailgate is hingably coupled to the lower edge of the rear opening of the truck bed in use. Further, a pair of recesses are each formed in an upper extent of one of the side edges of the rear opening of the truck bed, as shown in FIG. 3. For reasons that will soon become apparent, a pair of horizontally oriented hollow sleeves are mounted within the interior space of the tailgate and in communication with a pair of bores each formed in an upper extent of one of the intermediate edges of the tailgate. FIG. 2 depicts a pair of locking arms each having a linear short portion slidably positioned within one of the sleeves of the tailgate. A first end of the short portion of each locking arm has a frusto-conical configuration, as shown in FIG. 3. Each locking arm further includes a linear elongated portion with a first end hingably coupled to a second end of the corresponding short portion. Note FIG. 2. With continuing reference to FIG. 2, a motorized gear assembly is provided including a disk-shaped gear rotatably mounted within the interior space of the tailgate. Ideally, the gear is rotatable about an axis positioned between a center of the inboard face and outboard face of the tailgate. Second ends of the elongated portions of the locking arms are hingably coupled to diametrically opposed points on the disk-shaped gear. By this interconnection, the disk-shaped gear has a first orientation for retracting the short portions of the locking arms. Further, the disk-shaped gear has a second orientation for inserting the short portions of the locking arms into the recesses of the truck bed when the tailgate is closed. The gear assembly further includes a motor secured within the interior space of the tailgate between the inboard face and outboard face thereof. A rotor of the motor has a worm gear mounted thereon which resides in engagement with the disk-shaped gear. Mounted on the outboard face of the tailgate is a key assembly for receiving a key. The key assembly is connected between a battery and the motor for rotating the motor in a first direction when the key is inserted and turned in a counterclockwise direction. During this action, the disk-shaped gear is positioned in the first orientation to unlock the tailgate. The key assembly is further adapted for rotating the motor in a second direction when the key is inserted and rotated in the clockwise direction. This positions the disk-shaped gear in the second orientation to lock the tailgate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new truck tailgate with key actuated lock apparatus and method which has many of the advantages of the tailgate locking assemblies mentioned heretofore and many novel features that result in a new truck tailgate with key actuated lock which is not anticipated, rendered obvious, suggested, or even implied by any of the prior art tailgate locking assemblies, either alone or in any combination thereof.

It is another object of the present invention to provide a new truck tailgate with key actuated lock which may be easily and efficiently manufactured and marketed.

It is a further object of the present invention to provide a new truck tailgate with key actuated lock which is of a durable and reliable construction.

An even further object of the present invention is to provide a new truck tailgate with key actuated lock which is susceptible of a low cost of manufacture with regard to both materials and labor, and which accordingly is then susceptible of low prices of sale to the consuming public, thereby making such truck tailgate with key actuated lock economically available to the buying public.

Still yet another object of the present invention is to provide a new truck tailgate with key actuated lock which provides in the apparatuses and methods of the prior art some of the advantages thereof, while simultaneously overcoming some of the disadvantages normally associated therewith.

Still another object of the present invention is to provide a new truck tailgate with key actuated lock for preventing the unauthorized opening or theft of a tailgate.

Even still another object of the present invention is to provide a new truck tailgate with key actuated lock for use with a truck having a truck bed and a tailgate. At least one locking arm is pivotally mounted on the tailgate with a first orientation for allowing the opening of the tailgate and a second orientation for precluding the opening of the tailgate. A key assembly is adapted to receive a key. Such key assembly remains in communication with the locking arm for positioning the same in the first orientation upon the rotation of the key in a first direction and further for positioning the same in the second orientation upon the rotation of the key in a second direction.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
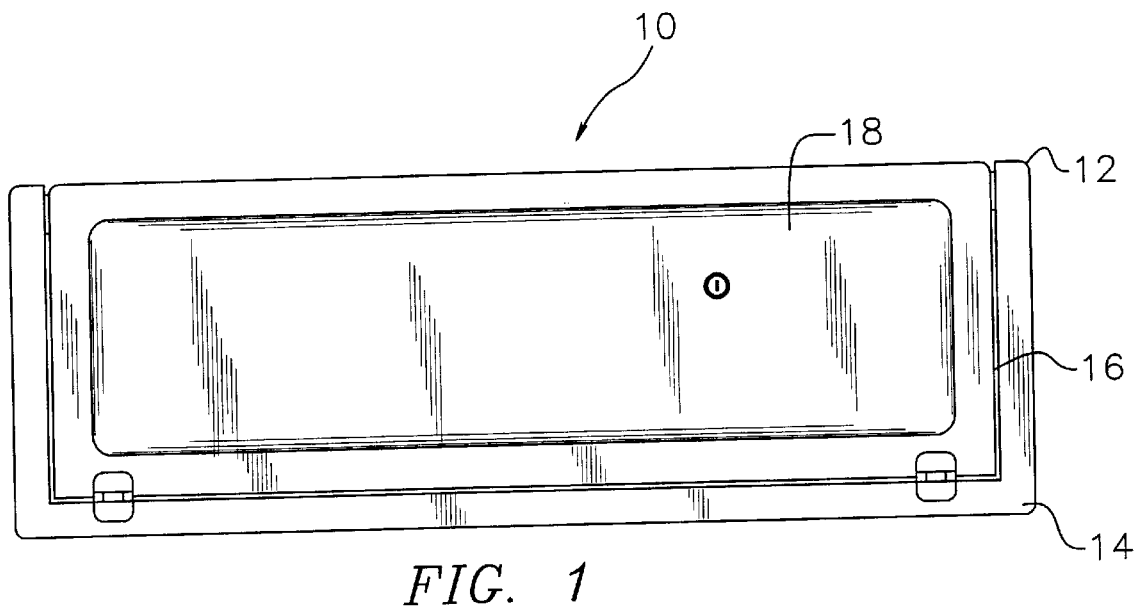
FIG. 1 is a rear view of a new truck tailgate with key actuated lock according to the present invention.
Figure 3:
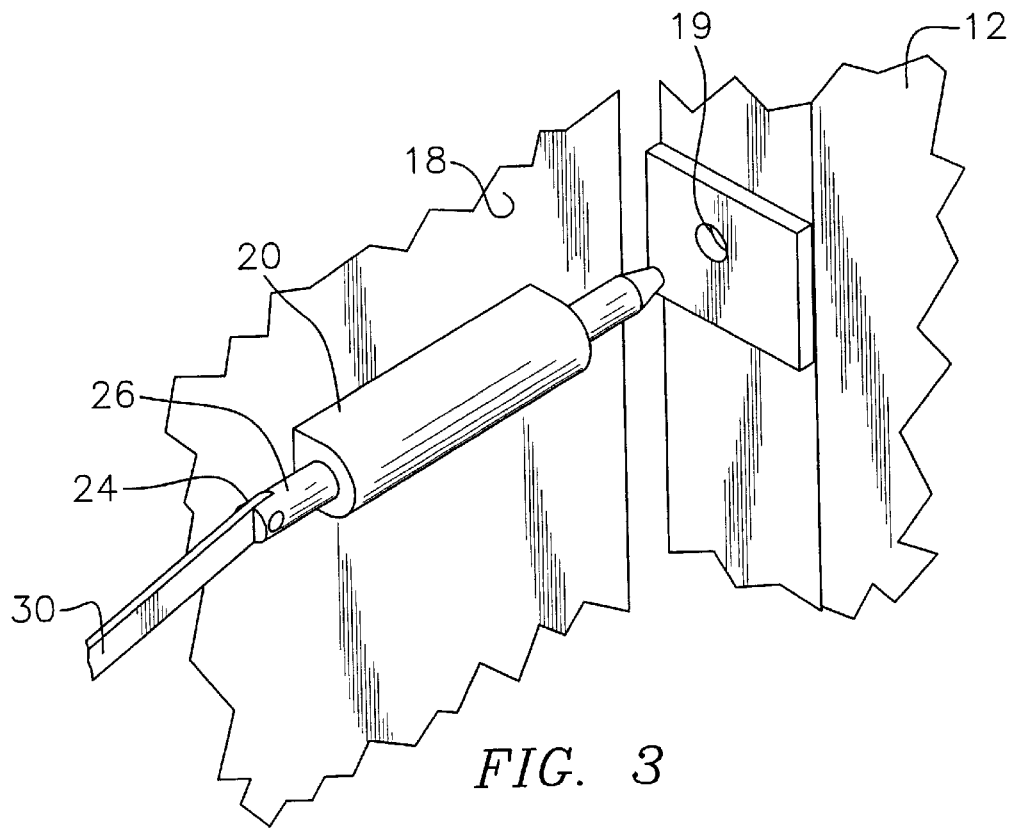
FIG. 3 is a close-up perspective view of the locking arms and recesses of the present invention.
Figure 2:
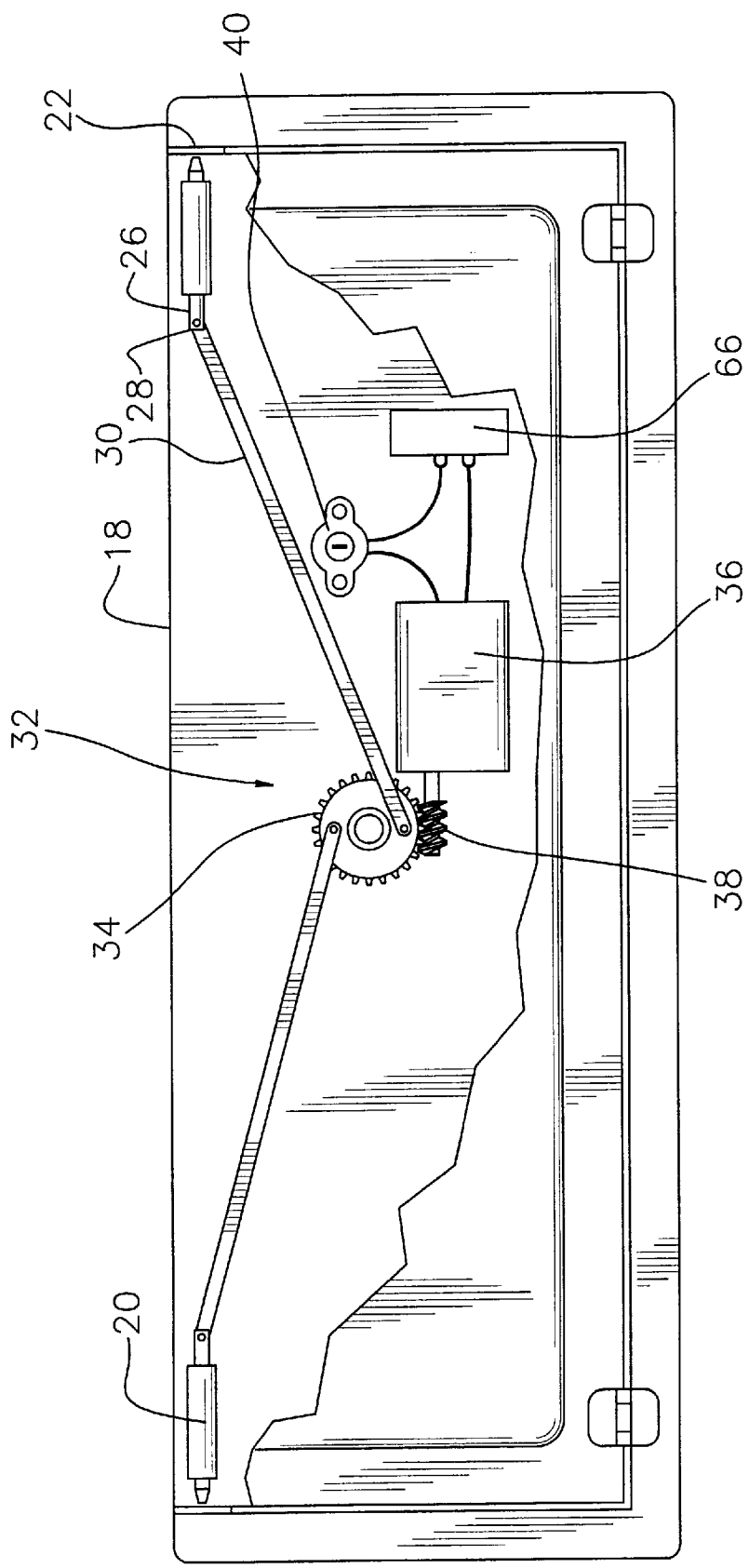
FIG. 2 is a rear sectional view of the present invention.

With reference now to the drawings, and in particular to FIGS. 1 through 3 thereof, a new truck tailgate with key actuated lock embodying the principles and concepts of the present invention and generally designated by the reference numeral 10 will be described.

The present invention, designated as numeral 10, is adapted for use with a truck 12 having a truck bed 14 defined by a rectangular bottom face and a pair of rectangular side walls. Such side walls are coupled to elongated side edges of the bottom face and extend upwardly therefrom to define a rectangular rear opening 16. As shown in FIGS. 1 & 2, the rear opening of the truck bed is encompassed by an elongated lower edge and a pair of short side edges.

The truck further includes a tailgate 18 with a planar rectangular configuration. The tailgate is defined by a planar rectangular outboard face, a planar rectangular inboard face and a thin periphery. This periphery is in turn defined by a top edge, a bottom edge and a pair of intermediate edges coupled to define an interior space. The bottom edge of the tailgate is hingably coupled to the lower edge of the rear opening of the truck bed in use. Further, a pair of circular recesses 19 are each formed in an upper extent of one of the side edges of the rear opening of the truck bed, as shown in FIG. 3. For reasons that will soon become apparent, a pair of horizontally oriented hollow sleeves 20 are mounted within the interior space of the tailgate and in communication with a pair of bores 22 each formed in an upper extent of one of the intermediate edges of the tailgate.

FIG. 2 depicts a pair of steel locking arms 24 each having a linear short portion 26 slidably positioned within one of the sleeves of the tailgate. A first end of the short portion of each locking arm has a frusto-conical configuration, as shown in FIG. 3. Each locking arm further includes a linear elongated portion 30 with a first end hingably coupled to a second end of the corresponding short portion. Note FIG. 2. Ideally, a length of the elongated portion of each locking arm is about three or four times that of the associated short portion.

With continuing reference to FIG. 2, a motorized gear assembly 32 is provided including a disk-shaped gear 34 rotatably mounted within the interior space of the tailgate. Ideally, the gear is rotatable about an axis positioned between a center of the inboard face and outboard face of the tailgate. Second ends of the elongated portions of the locking arms are hingably coupled to diametrically opposed points on the disk-shaped gear.

By this interconnection, the disk-shaped gear has a first orientation for retracting the short portions of the locking arms. Note FIG. 2. Further, the disk-shaped gear has a second orientation for inserting the short portions of the locking arms into the recesses of the truck bed when the tailgate is closed.

The gear assembly further includes a motor 36 secured within the interior space of the tailgate between the inboard face and outboard face thereof. A rotor of the motor has a worm gear 38 mounted thereon which resides in engagement with the disk-shaped gear.

Mounted on the outboard face of the tailgate is a key assembly 40 for receiving a key. The key assembly is connected between a battery 66 and the motor for rotating the motor in a first direction when the key is inserted and turned in a counterclockwise direction. During this action, the disk-shaped gear is positioned in the first orientation to unlock the tailgate. The key assembly is further adapted for rotating the motor in a second direction when the key is inserted and rotated in the clockwise direction. This positions the disk-shaped gear in the second orientation to lock the tailgate.

To accomplish this, the key assembly may essentially comprise of a double pole, double throw rotating switch which momentarily provides the motor with power of dual polarities. As an option, the key assembly may be equipped with a central neutral, grounded position such that the same is biased when rotated clockwise or counterclockwise. Further, the battery may be a dedicated battery situated within the tailgate or, in the alternative, may consist of the conventional vehicular battery. The present invention thus prevents unauthorized opening of a tailgate by children, thereby preventing injury. Also, the present invention combats theft of tailgates.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A truck tailgate key-actuated locking mechanism comprising, in combination:
    a truck with a truck bed defined by a rectangular bottom face and a pair of rectangular side walls coupled to elongated side edges of the bottom face and extending upwardly therefrom to define a rectangular rear opening encompassed by an elongated lower edge and a pair of short side edges, the truck further including a tailgate with a planar rectangular configuration and defined by a planar rectangular outboard face, a planar rectangular inboard face and a thin periphery defined by a top edge, a bottom edge and a pair of intermediate edges coupled to define an interior space, wherein the bottom edge of the tailgate is hingably coupled to the lower edge of the rear opening of the truck bed, a pair of recesses are each formed in an upper extent of one of the side edges of the rear opening of the truck bed, and a pair of horizontally oriented hollow sleeves are mounted within the interior space of the tailgate and positioned in alignment with a pair of bores each formed in an upper extent of one of the intermediate edges of the tailgate;
    a pair of locking arms each having a linear short portion slidably positioned within one of the sleeves of the tailgate and with a first end having a frusto-conical configuration, each locking arm further having a linear elongated portion with a first end hingably coupled to a second end of the corresponding short portion;
    a motorized gear assembly including a disk-shaped gear rotatably mounted within the interior space of the tailgate between a center of the inboard face and outboard face thereof, wherein second ends of the elongated portions of the locking arms are hingably coupled to diametrically opposed points on the disk-shaped gear such that the disk-shaped gear has a first orientation for retracting the short portions of the locking arms and a second orientation for inserting the short portions of the locking arms into the recesses of the truck bed when the tailgate is closed, the gear assembly further including a motor secured within the interior space of the tailgate between the inboard face and outboard face thereof with a rotor having a worm gear mounted thereon which resides in engagement with the disk-shaped gear; and
    a key assembly mounted on the outboard face of the tailgate for receiving a key, the key assembly connected between a battery and the motor for rotating the motor in a first direction when the key is inserted and rotated in a counterclockwise direction, thereby positioning the disk-shaped gear in the first orientation to unlock the tailgate, the key assembly further being for rotating the motor in a second direction when the key is inserted and rotated in the clockwise direction, thereby positioning the disk-shaped gear in the second orientation to lock the tailgate.

2. A truck tailgate key-actuated locking mechanism comprising:
    a truck with a truck bed defined by a bottom face and a pair of side walls, the side walls being coupled to side edges of the bottom face and extending upwardly from the bottom face to define a rear opening encompassed by a lower edge and a pair of side edges
    the truck further including a tailgate having an outboard face and an inboard face, the tailgate having a periphery and an interior space located between the outboard face and the inboard face, the tailgate being hingably coupled to the lower edge of the rear opening of the truck bed;
    at least one locking arm pivotally mounted in the interior space of the tailgate, each locking arm having a first portion hingably coupled to a second portion, each locking arm further having a first locking arm orientation wherein said first portion of each locking arm is retracted to a position within the interior space for allowing the opening of the tailgate and a second locking arm orientation wherein said first portion of each locking arm is extended outwardly from the tailgate into a recess in an associated side wall of the truck bed for precluding the opening of the tailgate;
    a motorized gear assembly including a disc gear rotatable mounted within the interior space of the tailgate, wherein an end of the second portion of each locking arm is hingably coupled to the disc gear such that the disc gear has a first gear orientation for retracting the first portion of each locking arm and a second gear orientation for extending the first portion of each locking arm into the associated recess of the truck bed; and
    a key assembly for receiving a key, activating the motorized gear assembly, and for positioning each locking arm in the first locking arm orientation upon the rotation of the key in a first direction and further for positioning each locking arm in the second locking arm orientation upon the rotation of the key in a second direction.

3. A truck tailgate key-actuated locking mechanism as set forth in claim 2 wherein the key assembly is mounted on an outboard face of the tailgate.

4. A truck tailgate key-actuated locking mechanism comprising:

a truck having a truck bed, the truck bed having a pair of side walls extending upwardly from a bottom face to define a rear opening encompassed by a lower edge and a pair of side edges, the truck further including a tailgate having an outboard face, an inboard face and a periphery defined by a top edge, a bottom edge and a pair of intermediate edges coupled to define an interior space, wherein the bottom edge of the tailgate is hingably coupled to the lower edge of the rear opening of the truck bed;

a pair of recesses, each recess being formed in an upper extent of one of the side edges of the rear opening of the truck bed;

a pair of hollow sleeves, said sleeves being mounted within the interior space of the tailgate and positioned in alignment with a pair of bores, each bore being formed in an upper extent of one of the intermediate edges of the tailgate;

a pair of locking arms, each locking arm having a first portion slidably positioned within an associated one of the sleeves of the tailgate, each first portion having a first end and a second end, each locking arm further having a second portion having a first end hingably coupled to the second end of the corresponding first portion;

a gear assembly including a first gear rotatably mounted within the interior space of the tailgate, wherein second ends of the second portions of the locking arms are hingably coupled to diametrically opposed points on the first gear such that the first gear has a first orientation for retracting the first portions of the locking arms and a second orientation for inserting the first portions of the locking arms into the recesses of the truck bed when the tailgate is closed, the first gear assembly further including a motor secured within the interior space of the tailgate, the motor having a rotor having a worm gear mounted on the rotor, the worm gear being engaged with the first gear; and a key assembly mounted on the outboard face of the tailgate for receiving a key, the key assembly being operationally coupled to the motor for rotating the motor in a first direction when the key is inserted and rotated in a first direction, thereby positioning the first gear in the first orientation to unlock the tailgate, the key assembly further being for rotating the motor in a second direction when the key is inserted and rotated in a second direction opposite the first direction, thereby positioning the first gear in the second orientation to lock the tailgate.

5. The tailgate key-actuated locking mechanism of claim 4, further comprising:

the first end of each first portion of each locking arm having a frusto-conical configuration for facilitating insertion of the first end into the recesses of the truck bed.

6. The tailgate key-actuated locking mechanism of claim 2, further comprising:

the motorized gear assembly having a motor having a rotor, the rotor having a worm gear mounted on the rotor, the worm gear being engaged with the disc gear for urging said disc gear between said first gear orientation and said second gear orientation.

* * * * *